US008781649B2

(12) United States Patent
Kar et al.

(10) Patent No.: US 8,781,649 B2
(45) Date of Patent: Jul. 15, 2014

(54) SYSTEM AND METHOD FOR DISPLAYING IN-TRAIL PROCEDURE (ITP) OPPORTUNITIES ON AN AIRCRAFT COCKPIT DISPLAY

(75) Inventors: Satyanarayan Kar, Karnataka (IN); Sanjib Kumar Maji, Karnataka (IN); Jitender Kumar Agarwal, UttarPradesh (IN)

(73) Assignee: Honeywell International Inc., Morristown, NJ (US)

( * ) Notice: Subject to any disclaimer, the term of this patent is extended or adjusted under 35 U.S.C. 154(b) by 162 days.

(21) Appl. No.: 13/424,032

(22) Filed: Mar. 19, 2012

(65) Prior Publication Data

US 2013/0245927 A1 Sep. 19, 2013

(51) Int. Cl.
*G01C 23/00* (2006.01)

(52) U.S. Cl.
USPC .......... 701/3

(58) Field of Classification Search
None
See application file for complete search history.

(56) References Cited

U.S. PATENT DOCUMENTS 3,875,379 A 4/1975 Vietor
5,077,673 A 12/1991 Brodegard et al.
5,574,647 A 11/1996 Liden
5,957,412 A 9/1999 Saint Upery et al.
6,085,145 A 7/2000 Taka et al.
6,127,944 A 10/2000 Daly et al.
6,148,259 A 11/2000 Hagelauer
6,433,729 B1 8/2002 Staggs
6,690,298 B1 2/2004 Barber et al.
6,696,980 B1 2/2004 Langner et al.
6,711,479 B1 3/2004 Staggs
6,720,891 B2 4/2004 Chen et al.
6,799,114 B2 9/2004 Etnyre
6,816,780 B2 11/2004 Naimer et al.
6,828,921 B2 12/2004 Brown et al.

(Continued)

FOREIGN PATENT DOCUMENTS

EP 1752739 A2 2/2007
EP 1752739 A3 1/2008

(Continued)

OTHER PUBLICATIONS

Chartrand, R. C. et al.; Operational Improvements From Using the In-Trail Procedure in the North Atlantic Organized Track System, Oct. 2009.
Murdoch, J. L. et al.; Enhanced Oceanic Operations Human-In-The-Loop In-Trail Procedure Validation Simulation Study, NASA/TP-2008-215313, Jun. 2008.

(Continued)

*Primary Examiner* — Thomas Tarcza
*Assistant Examiner* — Adam Alharbi
(74) *Attorney, Agent, or Firm* — Ingrassia Fisher & Lorenz, P.C.

(57) ABSTRACT

A system and method is provided for displaying ITP opportunities on an onboard display device of a host aircraft flying at a first flight level. Flight status data of the host aircraft and at least a first neighboring aircraft flying at a second flight level is obtained and processed to determine a first predicted time within which an ITP transition through the second flight level to a desired flight level can be made. A graphical representation of the host aircraft, the neighboring aircraft, and the first predicted time is rendered on the onboard display device.

20 Claims, 9 Drawing Sheets

(56) References Cited

U.S. PATENT DOCUMENTS

| | | | |
|---|---|---|---|
| 6,839,018 B2 | 1/2005 | Szeto et al. | |
| 6,876,906 B1 | 4/2005 | Zellers et al. | |
| 6,946,976 B1 | 9/2005 | Langner et al. | |
| 6,963,291 B2 | 11/2005 | Holforty et al. | |
| 7,103,455 B2 | 9/2006 | Subelet | |
| 7,148,816 B1 | 12/2006 | Carrico | |
| 7,366,591 B2 | 4/2008 | Hartmann et al. | |
| 7,367,526 B2 | 5/2008 | Baudry | |
| 7,375,678 B2 | 5/2008 | Feyereisen et al. | |
| 7,386,373 B1 | 6/2008 | Chen et al. | |
| 7,403,843 B2 | 7/2008 | Gremmert | |
| 7,453,375 B2 | 11/2008 | Chamas et al. | |
| 7,471,995 B1 | 12/2008 | Robinson | |
| 7,570,178 B1 | 8/2009 | Whalen et al. | |
| 7,650,232 B1 | 1/2010 | Paielli | |
| 7,746,343 B1 | 6/2010 | Charaniya et al. | |
| 7,747,382 B2 | 6/2010 | Small et al. | |
| 7,877,197 B2 | 1/2011 | Lewis et al. | |
| 7,961,135 B2 | 6/2011 | Smith et al. | |
| 7,965,223 B1 | 6/2011 | McCusker | |
| 8,271,152 B2 | 9/2012 | Singer et al. | |
| 8,403,259 B2 | 3/2013 | Charuel et al. | |
| 2002/0075171 A1 | 6/2002 | Kuntman et al. | |
| 2002/0089432 A1 | 7/2002 | Staggs et al. | |
| 2002/0133294 A1 | 9/2002 | Farmakis et al. | |
| 2003/0016158 A1 | 1/2003 | Stayton et al. | |
| 2003/0102987 A1 | 6/2003 | Walter | |
| 2006/0065779 A1 | 3/2006 | McCoskey et al. | |
| 2006/0290562 A1 | 12/2006 | Ehresman | |
| 2008/0065312 A1 | 3/2008 | Coulmeau et al. | |
| 2008/0109163 A1 | 5/2008 | Stone et al. | |
| 2008/0120032 A1 | 5/2008 | Brandao et al. | |
| 2008/0266054 A1 | 10/2008 | Crank | |
| 2008/0288164 A1 | 11/2008 | Lewis et al. | |
| 2008/0309518 A1 | 12/2008 | Aung | |
| 2009/0024311 A1 | 1/2009 | Hess | |
| 2009/0088972 A1 | 4/2009 | Bushnell | |
| 2009/0231163 A1 | 9/2009 | He | |
| 2009/0267800 A1 | 10/2009 | Hammack et al. | |
| 2010/0023187 A1 | 1/2010 | Gannon et al. | |
| 2010/0070180 A1 | 3/2010 | Ridenour | |
| 2010/0131121 A1 | 5/2010 | Gerlock | |
| 2010/0152932 A1 | 6/2010 | Das | |
| 2010/0286900 A1* | 11/2010 | Depape et al. | 701/120 |
| 2010/0292871 A1 | 11/2010 | Schultz et al. | |
| 2010/0305783 A1 | 12/2010 | Tucker et al. | |
| 2010/0332054 A1 | 12/2010 | Brandao et al. | |
| 2011/0006918 A1 | 1/2011 | Shafaat et al. | |
| 2011/0066360 A1 | 3/2011 | Haissig | |
| 2011/0066362 A1 | 3/2011 | He | |
| 2011/0118981 A1 | 5/2011 | Chamlou | |
| 2011/0144833 A1* | 6/2011 | Tjorhom et al. | 701/3 |
| 2011/0187588 A1 | 8/2011 | Khatwa et al. | |
| 2011/0224847 A1 | 9/2011 | Singer et al. | |
| 2011/0231096 A1 | 9/2011 | Ridenour, II | |
| 2011/0270472 A1 | 11/2011 | Shafaat et al. | |
| 2011/0270473 A1 | 11/2011 | Reynolds et al. | |
| 2011/0276198 A1 | 11/2011 | Khatwa et al. | |
| 2011/0282568 A1 | 11/2011 | Khatwa et al. | |
| 2011/0316857 A1 | 12/2011 | Pepitone et al. | |
| 2013/0057414 A1 | 3/2013 | Nutaro et al. | |
| 2013/0131888 A1 | 5/2013 | Nutaro et al. | |

FOREIGN PATENT DOCUMENTS

| | | |
|---|---|---|
| EP | 1947624 A1 | 7/2008 |
| EP | 2071542 A2 | 6/2009 |
| EP | 2345872 A2 | 7/2011 |
| EP | 2388759 A2 | 11/2011 |
| FR | 2898675 A1 | 3/2006 |
| FR | 2910124 A1 | 12/2006 |

OTHER PUBLICATIONS

Jones, K.M.; ADS-B In-Trail Procedures, Overview of Research Results; National Aeronautics and Space Administration; Presented to the ASAS TN2 Workshop, Sep. 2007.

Alam, S, et al.; An Assessment of BADA Fuel Flow Methodologies for In-Trail Procedure Evaluation; Defence & Security Applications Research Centre, University of New South Wales, Australian Defence Force Academy, Canberra, Australia.

Munoz, C.A. et al.; In-Trail Procedure (ITP) Algorithm Design; National Institute of Aerospace; Hampton, VA.

Richards, W.R. et al.; New Air Traffic Surveillance Technology; www.boeing.com/commercial/aeromagazine.

EP Examination Report for EP 11 154 857.4, dated Aug. 30, 2013.

EP Search Report for Application No. 13 155 828.0 dated Nov. 19, 2013.

USPTO Office Action for U.S. Appl. No. 13/407,475; notification date Nov. 21, 2012.

EP Search Report, EP11 154 857.4, dated Apr. 11, 2012.

EP Examination Report for EP 11 154 857.4, dated May 22, 2012.

Haissig C. M. et al. "Using TCAS Surveillance to Enable Legacy ADS-B Transponder Use for In-trail Procedures" Digital Avionics Systems Conference (DASC), IEEE/AIAA 31st; published by IEEE on Oct. 14, 2012; pp. 5D5-1.

"Getting to Grips with Surveillance"—Airbus; retrieved from the Internet on Nov. 20, 2013, URL: URL:http://www.cockpitseeker.com/wp-content/uploads/A320/pdf/data/gettingToGripsSurveillanceIssue1.pdf.

EP Search Report for Application No. EP 13 150 717.0 dated Dec. 3, 2013.

RTCA, Inc.; Safety, Performance and Interoperability Requirements Document for the In-Trail Procedure in Oceanic Airspace (ATSA-ITP) Application; RTCA/DO-312, Jun. 19, 2008.

USPTO Office Action for U.S. Appl. No. 12/563,691; notification date Dec. 9, 2011.

USPTO Final Office Action for U.S. Appl. No. 12/563,691; notification date Mar. 30, 2012.

USPTO Final Office Action for U.S. Appl. No. 13/407,475; notification date Feb. 6, 2013.

EP Search Report dated May 6, 2013 for application No. EP 11 154 900.2.

USPTO Office Action for U.S. Appl. No. 12/774,513; Notification date May 2, 2012.

USPTO Final Office Action for U.S. Appl. No. 12/774,513; notification date Aug. 30, 2012.

Chartrand et al.; Operational Improvements form the In-Trail Procedure in the North Atlantic Organized Track System; American Institute of Aeronautics and Astronautics.

Federal Aviation Administration; NextGen Operator and Airport Enablers; Supplement to NextGen Investment for Operators and Airports, FAA's NextGen Implementation Plan, Mar. 2011.

USPTO Office Action for U.S. Appl. No. 12/721,146; Notification Date Jan. 9, 2012.

USPTO Office Action for U.S. Appl. No. 13/463,657 dated Jun. 4, 2013.

Koeners, J.; deVries, M.; Delft University of Technology, Delft, The Netherlands; Conflict Resolution Support for Air Traffic Control Based on Solution Spaces: Design and Implementation; 2008 IEEE.

EP Search Report, EP 10 166 821.8, dated Apr. 21, 2011.

EP Communication for EP 10 166 821.8 dated May 23, 2011.

USPTO Notice of Allowance for U.S. Appl. No. 12/721,146; notification date Jun. 7, 2012.

EP Search Report for Application No. 13 157 907.0 dated Feb. 4, 2014.

EP Examination Report for Application No. 13 157 907.0 dated Feb. 13, 2014.

USPTO Notice of Allowance for U.S. Appl. No. 12/774,513; notification date Dec. 11, 2012.

* cited by examiner

SYSTEM AND METHOD FOR DISPLAYING IN-TRAIL PROCEDURE (ITP) OPPORTUNITIES ON AN AIRCRAFT COCKPIT DISPLAY

TECHNICAL FIELD

Embodiments of the subject matter described herein relate generally to avionics systems such as cockpit flight display systems. More particularly, embodiments of the subject matter described herein relate to a system and method for displaying symbology on a cockpit display that relates to an In-Trail Procedure (ITP).

BACKGROUND

An in-trail procedure (ITP) is a protocol followed by an aircraft that desires to change its current flight level to a new flight level by descending or climbing in front of or behind one or more potentially blocking aircraft flying at an intervening flight level. In accordance with ITP criteria, certain conditions must be satisfied before the flight crew member issues a request for clearance to proceed with the flight level change. Whether or not the conditions are satisfied will depend on a number of dynamically changing factors associated with the host aircraft and other aircraft, such as the current geographic position of the aircraft, the current speed of the aircraft, the current heading of the aircraft, the desired new flight level, and the current flight level.

Modern flight deck instrumentation might include a traffic display that provides a two-dimensional representation of a host aircraft and neighboring aircraft. Such display systems typically provide a number of parameters and visual indicators that enable a pilot to form a quick mental picture of the vertical situation of the host aircraft. For example, such a system might include displays of an aircraft symbol, the aircraft altitude, the vertical flight plan, and terrain. In this manner, a member of the aircraft flight crew can obtain information related to the vertical situation of the aircraft relative to other aircraft with a simple glance at the display system.

Such a system could be used to identify the vertical position of potentially blocking aircraft for purposes of an ITP. However, it is possible that at the moment when the pilot views the ITP display, (1) an intermediate flight level is blocked by traffic that does not meet the ITP distance/speed criteria or (2) the desired flight level is not available because traffic is present with which the host aircraft cannot maintain the standard separation when it climbs to the desired flight level, notwithstanding that at a later time, the opportunity for the ITP transition might exist. It may be necessary for the pilot to repeatedly scan the ITP display in order to detect an opportunity for an ITP transition because the display does not provide any information regarding when an opportunity for a transition to the desired flight level will arise. Thus, the pilot's work load is increased.

Considering the foregoing, it would be desirable to provide a system and method for providing a graphical/textual indication on an ITP display that is representative of the time when an opportunity for an ITP maneuver will be available.

BRIEF SUMMARY

In accordance with the forgoing, there is provided a method for displaying ITP opportunities on an onboard display device of a host aircraft flying at a first flight level. The method comprises obtaining flight status data of the host aircraft and at least a first neighboring aircraft flying at a second flight level, processing the flight status data of the host aircraft and the neighboring aircraft to determine a first predicted time within which an ITP transition through the second flight level to a desired flight level can be made, rendering on the onboard display device a graphical representation of the host aircraft and the neighboring aircraft, and rendering the first predicted time on the onboard display device.

There is also provided a method for predicting ITP opportunities for a host aircraft desiring to transition from a first flight level to a second flight level, wherein neighboring aircraft occupy flight levels between the first and second flight levels. The method comprises predicting a set of optimum flight level availability times, predicting a set of intermediate flight level availability times, predicting a time-set of ITP opportunities, and rendering on a display device symbology visually representative of the ITP opportunities.

An onboard flight display system, deployed on a host aircraft, for displaying ITP opportunities while flying at a first flight level, is also provided. The system comprises an onboard display device and a processor operatively coupled to the display device and configured to (1) process flight status data of the host aircraft and at least one neighboring aircraft flying at a second flight level, (2) determine a predicted time within which the host aircraft can perform an ITP transition through the second flight level to a third flight level, and (3) render the predicted time on the display device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
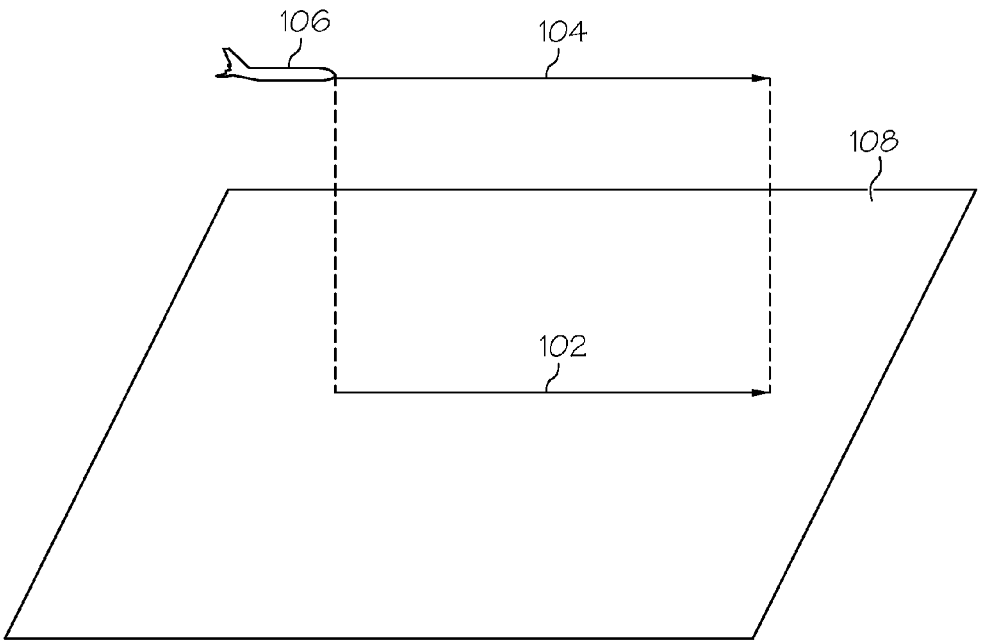
FIG. 1 is a diagram that illustrates the track associated with the flight path of an aircraft.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Although not always required, the techniques and technologies described here are suitable for use by aircraft using an ITP in an oceanic (or other) track system. For example, the techniques and technologies presented here could be used in connection with the ITP as defined and explained in the *Safety, Performance and Interoperability Requirements Document for the In-Trail Procedure in Oceanic Airspace* (*ATSA-ITP*) *Application*, RTCA/DO-312, Jun. 19, 2008. For ease of understanding and clarity, the following description employs terminology that is consistent with that used in the RTCA/DO-312 document. Moreover, the relevant portions of the RTCA/DO-312 document are incorporated by reference herein.

FIG. 1 is a diagram that illustrates track 102 associated with the flight path 104 of aircraft 106. Track 102 represents a projection of the flight path 104 onto a flat plane 108, which may correspond to the ground. Accordingly, track 102 will be the same whether the aircraft 106 maintains a fixed altitude, climbs, or descends while following flight path 104.

Figure 2:
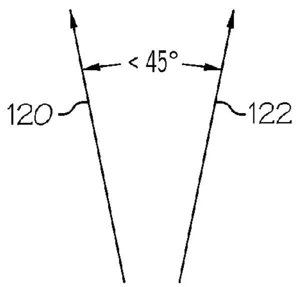
FIG. 2 is a diagram that illustrates the diverging tracks associated with two different aircraft.
Figure 3:
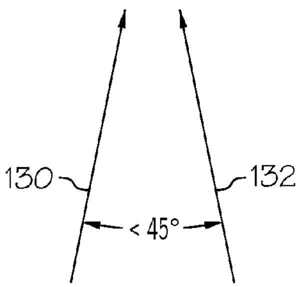
FIG. 3 is a diagram that illustrates the converging tracks associated with two different aircraft.

The RTCA/DO-312 document specifies that an in-trail procedure is a procedure that is employed by an aircraft that desires to change its flight level to a new flight level by climbing or descending in front or behind one or two, or between two same tracks, potentially blocking aircraft which are at an intervening flight level. A potentially blocking aircraft is an aircraft at an intervening flight level whose ADS-B data is available to the aircraft wishing to conduct an ITP maneuver. The host aircraft and any neighboring aircraft of interest (i.e., a potentially blocking aircraft) must be same track aircraft in order for an ITP flight level change to be requested. In this regard, "same track" means same direction tracks and intersecting tracks (or portions thereof) the angular difference of which is less than 45 degrees or more than 315 degrees. As an example, FIG. 2 is a diagram that illustrates the tracks 120 and 122 associated with two different aircraft. Even though the tracks 120/122 are divergent, they are considered to be in the same direction for purposes of the ITP because the angle between them is less than 45 degrees. As another example, FIG. 3 illustrates the tracks 130/132 associated with two different aircraft. Even though the tracks 130/132 are convergent, they are considered to be in the same direction for purposes of the ITP because the angle between them is less than 45 degrees.

Figure 4:
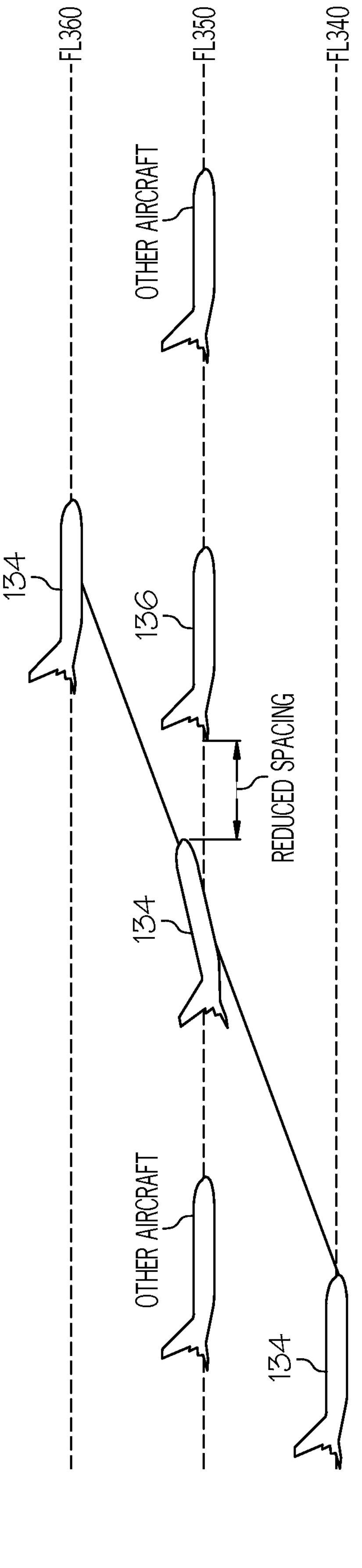
FIG. 4 is a diagram that illustrates a basic ITP maneuver.

As stated above, ITP is a protocol that can be followed when an aircraft seeks to change its flight level to a new flight level in the presence of potentially blocking aircraft located at an intervening flight level. For example, FIG. 4 is a vertical profile view illustrating a basic ITP procedure. In this case, aircraft 134 (i.e. the ITP aircraft) is seeking approval of an ITP procedure to climb from an initial flight level (FL340) through an intervening flight level (FL350) to a desired flight level (FL360). According to the RTCA/DO-312 document, ASTA-ITP was developed to enable either leading or following same track aircraft to perform a climb or descent to a requested flight level through an intervening flight level that might otherwise be disallowed when using standard separation minima. Moreover, the ITP specifies certain criteria that must be satisfied before the host aircraft can issue a request for ITP flight level change (such requests are issued to Air Traffic Control (ATC)).

RTCA/DO-312 defines reference aircraft as one or two similar track, potentially blocking aircraft no more than: 3,000 feet above or below the initial flight level, if vertical separation is 1,000 feet; or 2,000 feet above or below the initial flight level, if the vertical separation minima is 2,000 feet; with qualified ADS-B data that meets ITP speed/distance criteria and that will be identified to ATC by the ITP aircraft as part of the ITP clearance request. At least one of two ITP speed/distance criteria must be met: (1) if the ITP distance to a reference aircraft 136 is greater than or equal to 15 nautical miles, then the groundspeed differential between the two aircraft must be less than or equal to 20 knots; or (2) if the ITP distance to a reference aircraft 136 is greater than or equal to 20 nautical miles, then the groundspeed differential between the two aircraft must be less than or equal to 30 knots.

Figure 5:
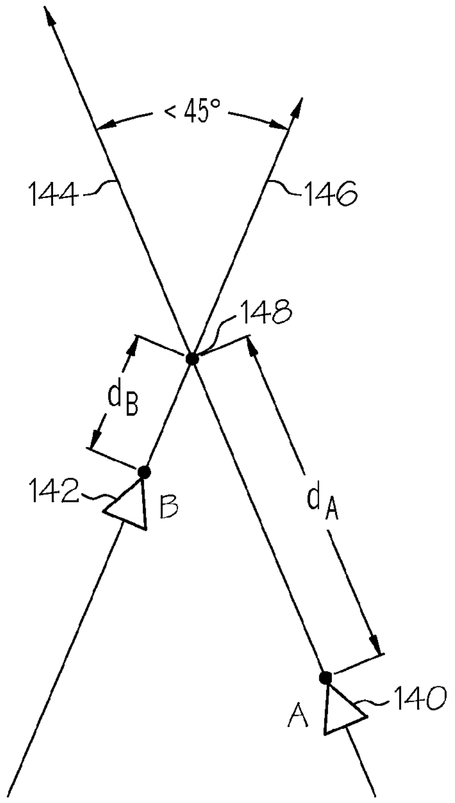
FIG. 5 is a diagram that illustrates the intersecting tracks associated with two different aircraft.

The ITP distance represents one appropriate measure of distance between the host aircraft and a nearby reference aircraft and potentially blocking, same track aircraft, which may be in front of or behind the host aircraft. Depending upon the particular embodiment, other distance metrics, distance measures, or relative spacing metrics could be used. For instance, the system could contemplate linear distance, time, aircraft acceleration, relative speed, closing rate, and/or other measureable or computable values that are dependent on the current geographic position, speed, acceleration, heading, attitude, or other operating status of the aircraft. The RTCA/DO-312 document defines the ITP distance as the distance between reference or potentially blocking aircraft and the ITP aircraft as defined by the difference in distance to a common point along each aircraft's track. In this regard, FIG. 5 is a diagram that illustrates the intersecting tracks associated with two different aircraft. In FIG. 5, one aircraft 140 is labeled "A" and another aircraft 142 is labeled "B". The aircraft 140 has a corresponding track 144, and the aircraft 142 has a corresponding track 146 that intersects the track 144 at a point 148. Note that the aircraft 140/142 are considered to be in the same direction because the angle between the two tracks 144/146 is less than 45 degrees. In FIG. 5, the label "$d_A$" identifies the current distance between the aircraft 140 and the point 148, and the label "$d_B$" identifies the current distance between the aircraft 142 and the point 148. For this example, the ITP distance ($d_{ITP}$) is defined by the following expression: $d_{IRP}=d_A-d_B$.

Figure 6:
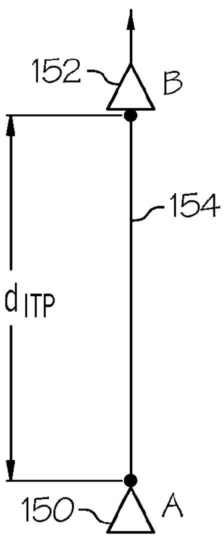
FIG. 6 is a diagram that illustrates the overlapping tracks associated with two different aircraft.

As another example, FIG. 6 is a diagram that illustrates the overlapping tracks associated with two different aircraft. In FIG. 6, one aircraft 150 is labeled "A" and another aircraft 152 is labeled "B". In this scenario, the two aircraft have a common or overlapping track 154. Consequently, the current distance between the two aircraft is also considered to be the ITP distance under these conditions. In FIG. 6, the label "$d_{ITP}$" indicates the current ITP distance between the aircraft 150 and the aircraft 152.

The systems and methods presented herein can be utilized to predict and display opportunities for ITP transitions. It is also contemplated that the proposed systems and methods will determine and display the time when a desired flight level and intermediate flight levels will become available.

In a first scenario, it is contemplated that a Flight Management System (FMS) will predict the optimum climb/descent altitudes. These are provided to a traffic computer or ITP display that determines the ITP transition possibilities for the predicted altitude based on received ADS-B IN data. The traffic computer, in turn, predicts different time sets and the corresponding candidate reference aircraft for the flight level changes proposed by the FMS. This prediction includes a consideration of the host aircraft's ground speed to predict the ITP transition times, which are displayed on the ITP display as will be shown and described hereinafter.

In a second scenario, it is contemplated that a pilot selects a desired flight level change using the ITP display. The traffic computer then predicts a set of ITP opportunities available for transition to the desired flight level, which are displayed on the ITP display as in the first scenario.

In both scenarios, the traffic computer considers (1) all traffic present at the desired flight level and the closing or separating ground speed of the traffic intruders with respect to the host aircraft, and (2) the intent of the traffic from the traffic's ADS-B OUT transmissions; e.g. when the traffic is planning to change flight level and/or transition from the host aircraft's desired flight level. The traffic computer determines the time when an intermediate flight level will become available for transition. It considers the present position and ground speed difference of aircraft present in the intermediate flight level and determines when not more than two aircraft will be sufficiently separated to meet the criteria to be considered candidate reference aircraft. The traffic computer also validates that all other aircraft present in the intermediate flight level meet standard separation criteria with the host aircraft.

Thus, it is contemplated that the system and methods provided herein will determine, for each ITP opportunity: (1) a desired flight level, (2) the desired flight level availability time determined in accordance with the requirement of providing required standard separation with aircraft at the desired flight level, (3) the availability time of intermediate flight levels, (4) a maximum of two candidate reference aircraft with which the host aircraft can conduct an ITP transition for that flight level at the available time, and (5) the time duration of the ITP opportunity consisting of an ITP Start Time and an ITP End Time in minutes and seconds from the current time or in Greenwich Mean Time (Zulu Time). The time when the host aircraft can request an ITP transition and the candidate reference aircraft will be displayed.

Figure 7:
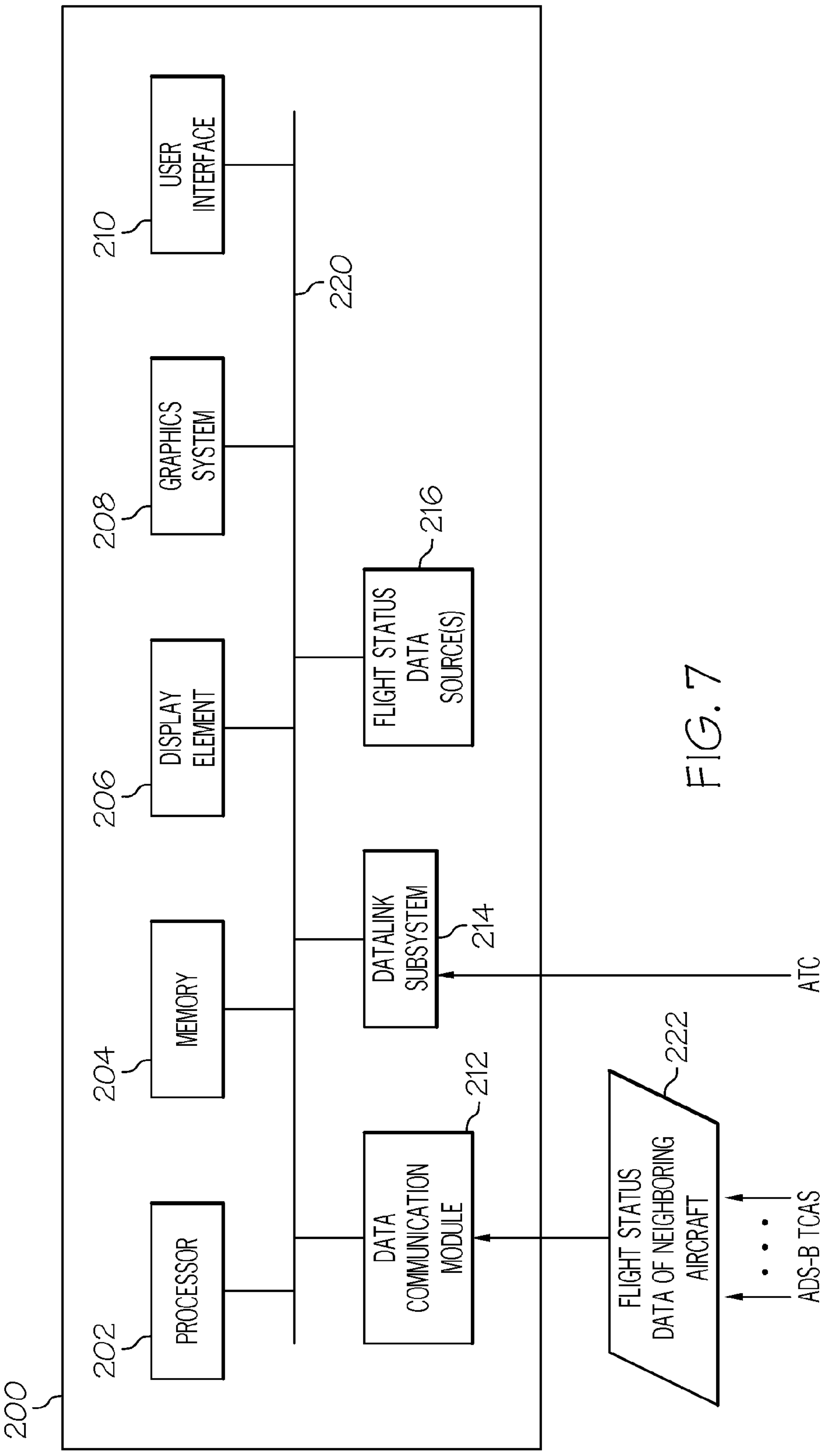
FIG. 7 is a block diagram of an exemplary embodiment of a flight deck display system.

The above described displays can be generated using a suitably configured onboard system, such as a flight deck display system. More preferably, the display can be generated by the traffic computer that may receive data from the Flight Management System (FMS). In this regard, FIG. 7 is a schematic representation of an exemplary embodiment of a flight deck display system 200 that is suitable for use with a vehicle such as an aircraft. In exemplary embodiments, the display system 200 is located onboard the host aircraft, i.e., the various components and elements of the display system 200 reside within the host aircraft, are carried by the host aircraft, or are attached to the host aircraft. The illustrated embodiment of the display system 200 includes, without limitation: at least one processor 202; an appropriate amount of memory 204; a display element 206; a graphics system 208; a user interface 210; a data communication module 212; a data link subsystem 214; and at least one source of flight status data 216. These elements of the display system 200 may be coupled together by a suitable interconnection architecture 220 that accommodates data communication, the transmission of control or command signals, and/or the delivery of operating power within the display system 200. It should be understood that FIG. 7 is a simplified representation of the display system 200 that will be used for purposes of explanation and ease of description, and that FIG. 7 is not intended to limit the application or scope of the subject matter in any way. In practice, the display system 200 and the host aircraft will include other devices and components for providing additional functions and features, as will be appreciated in the art. Furthermore, although FIG. 7 depicts the display system 200 as a single unit, the individual elements and components of the display system 200 could be implemented in a distributed manner using any number of physically distinct pieces of hardware or equipment.

The processor 202 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor 202 obtains and processes current flight status data (of the host aircraft and one or more candidate reference aircraft and other neighboring aircraft) to determine ITP transition opportunities and to control the rendering of the ITP display in an appropriate manner.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor 202 such that the processor 202 can read information from, and write information to, the memory 204. In the alternative, the memory 204 may be integral to the processor 202. As an example, the processor 202 and the memory 204 may reside in an ASIC. In practice, a functional or logical module/component of the display system 200 might be realized using program code that is maintained in the memory 204. For example, the graphics system 208, the data communication module 212, or the datalink subsystem 214 may have associated software program components that are stored in the memory 204. Moreover, the memory 204 can be used to store data utilized to support the operation of the display system 200, as will become apparent from the following description.

In an exemplary embodiment, the display element 206 is coupled to the graphics system 208. The graphics system 208 is coupled to the processor 202 such that the processor 202 and the graphics system 208 cooperate to display, render, or otherwise convey one or more graphical representations, synthetic displays, graphical icons, visual symbology, or images associated with operation of the host aircraft on the display element 206, as described in greater detail below. An embodiment of the display system 200 may utilize existing graphics processing techniques and technologies in conjunction with the graphics system 208. For example, the graphics system 208 may be suitably configured to support well known graphics technologies such as, without limitation, VGA, SVGA, UVGA, or the like.

In an exemplary embodiment, the display element 206 is realized as an electronic display configured to graphically display flight information or other data associated with operation of the host aircraft under control of the graphics system 208. In practice, the processor 202 and/or the graphics system 208 produces image rendering display commands that are received by the display element 206 for purposes of rendering the display. The display element 206 is usually located within a cockpit of the host aircraft. It will be appreciated that although FIG. 7 shows a single display element 206, in practice, additional display devices may be present onboard the host aircraft.

The illustrated embodiment of the display system 200 includes a user interface 210, which is suitably configured to receive input from a user (e.g., a pilot) or other crew member and, in response to the user input, supply appropriate command signals to the processor 202. The user interface 210 may be any one, or any combination, of various known user interface devices or technologies, including, but not limited to: a touchscreen, a cursor control device such as a mouse, a trackball, or joystick; a keyboard; buttons; switches; or knobs. Moreover, the user interface 210 may cooperate with the display element 206 and the graphics system 208 to provide a graphical user interface. Thus, a user can manipulate the user interface 210 by moving a cursor symbol rendered on the display element 206, and the user may use a keyboard to, among other things, input textual data. For example, the user could manipulate the user interface 210 to enter a desired or requested new flight level into the display system 200.

In an exemplary embodiment, the data communication module 212 is suitably configured to support data communication between the host aircraft and one or more remote systems. More specifically, the data communication module 212 is used to receive current flight status data 222 of other aircraft that are near the host aircraft. In particular embodiments, the data communication module 212 is implemented as an aircraft-to-aircraft data communication module that receives flight status data from an aircraft other than the host aircraft. For example, the data communication module 212 may be configured for compatibility with Automatic Dependent Surveillance-Broadcast (ADS-B) technology, with Traffic and Collision Avoidance System (TCAS) technology, and/or with similar technologies.

The flight status data 222 may include, without limitation: airspeed data; fuel consumption; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 200 is suitably designed to process the flight status data 222 in the manner described in more detail herein. In particular, the display system 200 can use the flight status data 222 when rendering the ITP display.

The data link subsystem 214 enables the host aircraft to communicate with Air Traffic Control (ATC). In this regard, the data link subsystem 214 may be used to provide ATC data to the host aircraft and/or to send information from the host aircraft to ATC, preferably in compliance with known standards and specifications. Using the data link subsystem 214, the host aircraft can send ITP requests to ground based ATC stations and equipment. In turn, the host aircraft can receive ITP clearance or authorization from ATC (when appropriate) such that the pilot can initiate the requested flight level change.

In operation, the display system 200 is also configured to process the current flight status data for the host aircraft. In this regard, the sources of flight status data 216 generate, measure, and/or provide different types of data related to the operational status of the host aircraft, the environment in which the host aircraft is operating, flight parameters, and the like. In practice, the sources of flight status data 216 may be realized using line replaceable units (LRUs), transducers, accelerometers, instruments, sensors, and other well-known devices. The data provided by the sources of flight status data 216 may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; fuel consumption, etc. The display system 200 is suitably designed to process data obtained from the sources of flight status data 216 in the manner described in more detail herein. In particular, the display system 200 can use the flight status data of the host aircraft when rendering the ITP display.

As previously stated, in a first scenario the FMS provides the optimum altitude considering aircraft performance and weather conditions, and in a second scenario, the pilot selects the optimum altitude. In both scenarios, the ITP prediction algorithm, discussed herein below, is utilized. In an embodiment, the pilot's flight level selection takes priority over the FMS.

Figure 8:
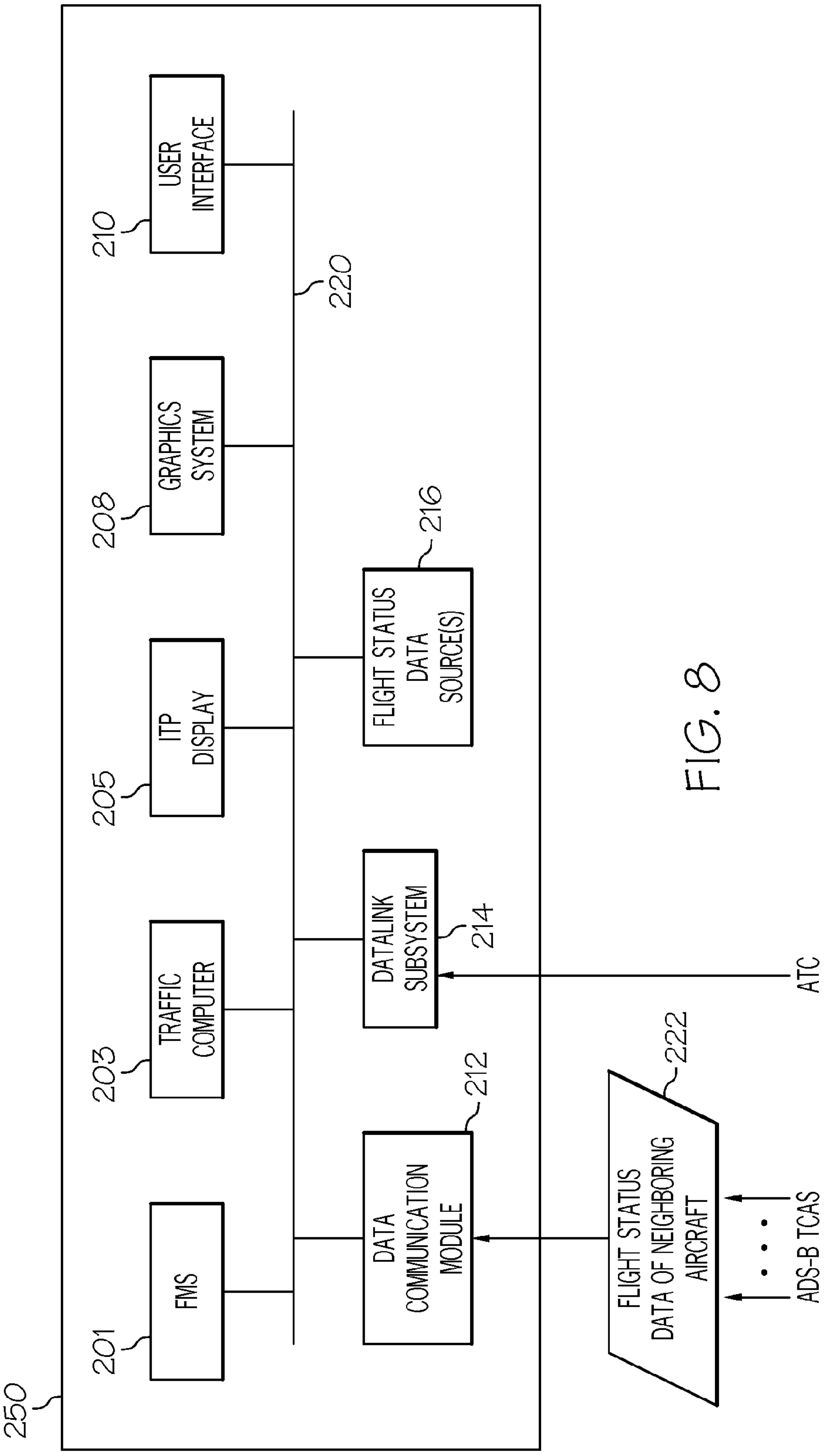
FIG. 8 is a block diagram of a further exemplary embodiment of a flight deck display system.

FIG. 8 is a schematic representation of a further exemplary embodiment of a flight deck display system 250 wherein like reference numerals represent like elements. The illustrated embodiment again includes, without limitation, graphics system 208, user interface 210, data communications module 212, data link subsystem 214, and at least one source of flight status data source 216 as was the case in the embodiment shown in FIG. 7. However, this exemplary embodiment includes Flight Management System (FMS) 201, a traffic computer 203, and an ITP Display 205 each coupled to interconnection architecture 220.

Flight Management System 201 is a specialized computer that automates a variety of in-flight tasks such as in-flight management of the flight plan. Using various sensors, the FMS determines the aircrafts position and guides the aircraft along its flight plan using its navigation database. Traffic Computer 203 processes surveillance data using ADS-B reports from the ADS-B receive function, and performs application specific processing. Surveillance reports, tasks, and any application specific information, e.g., alerts or guidance cues, are output to the traffic display function.

As stated previously, FMS 201 is integrated with the traffic computer 203 (FIG. 8) and may predict the optimum altitude taking weather conditions and host aircraft dynamics into account. The predicted flight level changes are provided to ITP display 205, which determines flight level availability considering traffic in that flight level and determines when standard separation at the desired flight level will exist with respect to the host aircraft. The ITP display also determines availability of intermediate flight levels for transition. Based on the availability of the desired flight level and intermediate flight levels, the ITP opportunity time sets may be determined. Graphics system 208 (FIG. 8) then generates symbology that is provided to the ITP display 205 and visually/textually represents the opportunity time sets.

Figure 9:
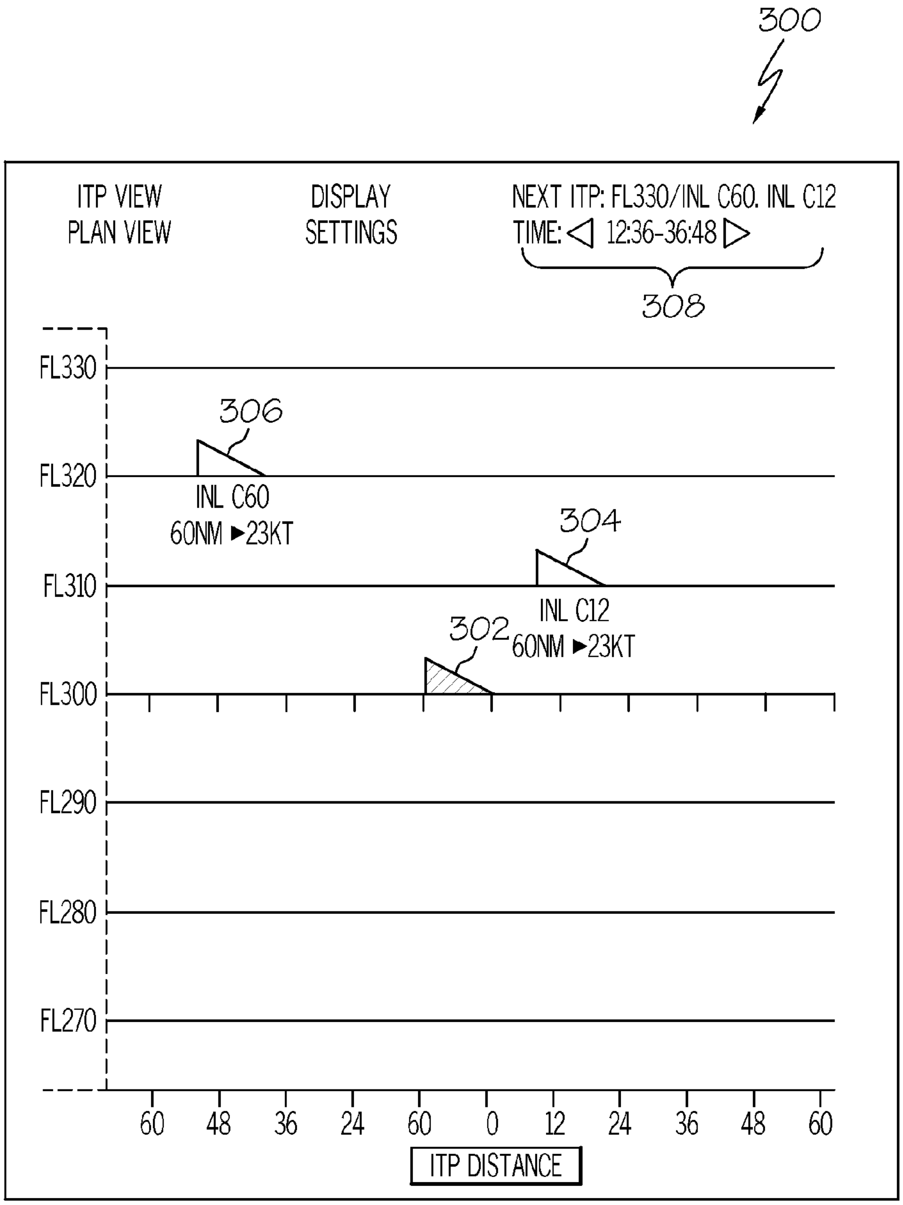
FIG. 9 illustrates an exemplary embodiment of an ITP display process.

FIG. 9 illustrates an exemplary ITP display screen 300, in accordance with an embodiment. Host aircraft 302 is depicted cruising at FL300. In addition, a first candidate reference aircraft 304 (INLC12) is shown at FL310 and a second candidate reference aircraft 306 (INLC60) is depicted at FL320. The ITP predictions 308 are displayed in the upper right-hand corner of display screen 300 and are shown more clearly in FIG. 10.

Figure 10:
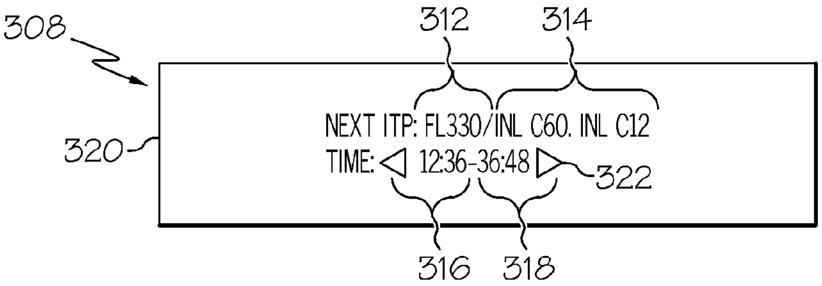
FIG. 10 illustrates in more detail the symbology rendered on a flight deck display that is visually and textually representative of the ITP opportunity shown in the upper right-hand corner of the display screen shown in FIG. 9.

Referring now to FIG. 10, ITP prediction 308 includes a textual representation of the next ITP opportunity comprising the predicted next desired flight level 312 and a maximum of two candidate reference aircraft 314. Also displayed is the predicted start time “12:36” 316 and the predicted end time “30:48” 318 representing the time between or within which an ITP transition may be performed. The time may be represented as the time from the current time or, for example, Greenwich Mean Time (Zulu Time). If the ITP start time is immediate, it may be textually represented by the word “NOW”. If desired, a color code may be employed wherein when the ITP opportunity is blocked until the ITP start time, the start time is displayed in a first color (e.g. blue), and if the opportunity is immediately available, the word “NOW” is displayed in a second color (e.g. white).

A “PREVIOUS” scroll button 320 and a “NEXT” scroll button 322 are also provided in the event that multiple ITP opportunities are available. These scroll buttons permit a pilot to review successive ITP opportunities in ascending order from the current start time. Each time the next ITP Opportunity is selected for review, the candidate reference aircraft for that set is shown on the ITP display. After the pilot initiates an ITP procedure (i.e. selects one of the ITP opportunity sets and sends an ITP request to Air Traffic Control (ATC)), the ITP prediction symbology is removed from the display. If only a single opportunity can be calculated, the NEXT and PREVIOUS buttons will be disabled or removed. Finally, referring again to FIG. 9, it can be seen that candidate reference aircraft 304 is tagged with ITP start time “12:36”, and candidate reference aircraft 306 is tagged with the word “NOW”.

Figure 11:
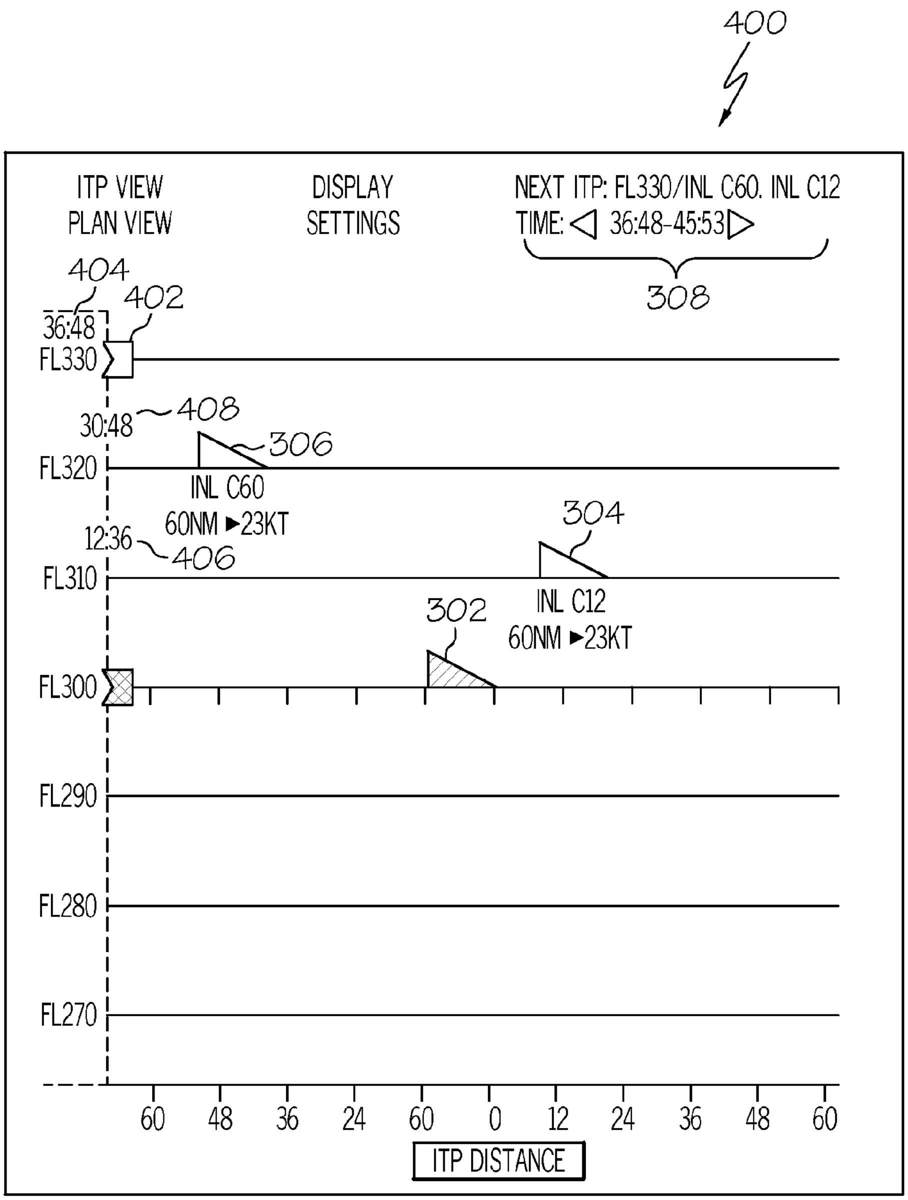
FIG. 11 illustrates an exemplary display screen in accordance with an embodiment.

FIG. 11 illustrates an exemplary ITP display screen 400 in accordance with a further embodiment. A desired flight level marker or bug 402 may be attached to the desired flight level FL330 to indicate the optimum altitude. In addition, the desired flight level availability start time 404 is displayed adjacent to the desired flight level label (FL330) on the ITP display. This information is presented to the pilot, enabling the pilot to see the reason why an ITP opportunity is not present. The ITP prediction algorithm also determines when the intermediate flight levels will be available for transition and the corresponding times 406 and 408 are displayed adjacent to the flight level labels FL310 and FL320, respectively, on the ITP display. If a large amount of traffic is displayed on the ITP display, only the final ITP opportunity time may be displayed to avoid clutter on the display. The final ITP opportunity time 308 is displayed in the top right hand corner of the display as shown in FIGS. 9 and 10 and is always displayed. This is sufficient for the pilot to make an ITP request. However, if only limited traffic is visible on the display, then individual availability times of the desired flight level and the intermediate flight levels will be displayed to provide a visual indication of the relationship of the ITP opportunity time with the availability time of the desired flight level and the availability times of the intermediate flight levels.

Figure 12:
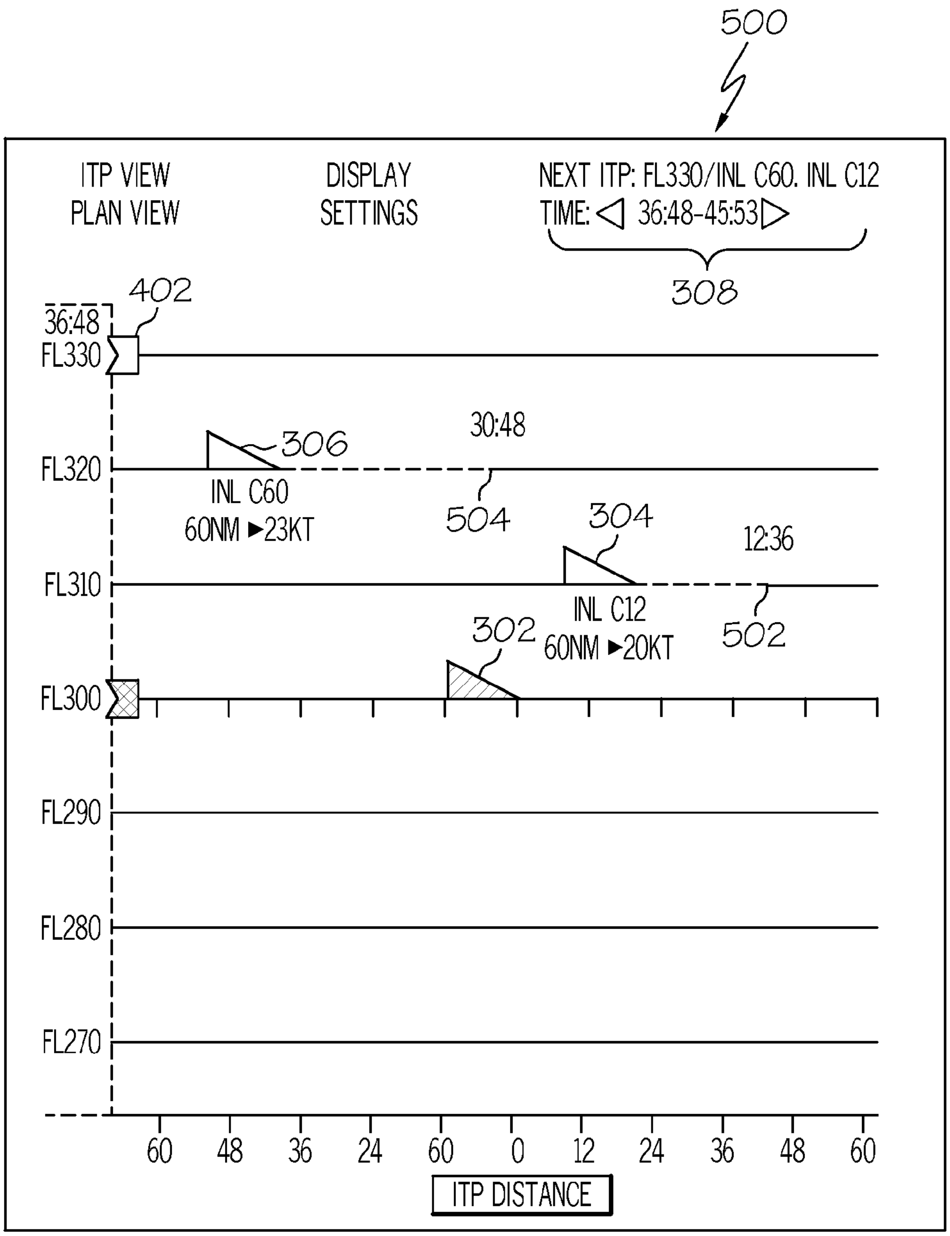
FIG. 12 illustrates an exemplary display screen in accordance with a further embodiment.

FIG. 12 illustrates an exemplary ITP display screen 500 in accordance with a still further embodiment. As was the case previously, host aircraft 302 is cruising at flight level FL300, and first and second candidate reference aircraft 304 and 306 are at flight levels FL310 and FL320 respectfully. Once more, the desired flight level is flight level FL330. In this case, the intermediate flight level availability start time is displayed at a point on the flight level line where the traffic on reaching that point will become non-blocking For example, if traffic has a ground speed that differs from the host aircraft by less than twenty knots at the intermediate flight level, the intermediate flight level will become available for an ITP maneuver when the traffic reaches the fifteen NM ITP distance. Thus, the calculated time will be displayed on the intermediate flight level line at a point that the traffic would reach the fifteen NM point using the present ground speed difference with the host aircraft. Thus, intermediate flight level FL310 will be available for an ITP transition in twelve minutes, thirty-six seconds (the time it would take candidate reference aircraft 304 to reach the point 502 where “12:36” is displayed). Flight level line FL310 may be displayed as dashed until that point and then become a solid line thereafter. Similarly, flight level line FL320 may be displayed as a dashed line until the time “30:48” (point 504) corresponding to the time it would take for candidate reference aircraft 306 to reach point 504, and solid thereafter. Traffic 306 is currently blocking, but will become a non-blocking aircraft at point 504. The time may be displayed in a first color at point 502 (e.g. blue) as it is in the upper right-hand corner of the display.

In the case when the FMS cannot predict the optimum altitude or the FMS predicted optimum altitude is not supplied to the traffic computer, a pilot selected flight level is treated as the desired flight level for which the ITP opportunities are calculated as described above.

Figure 13:
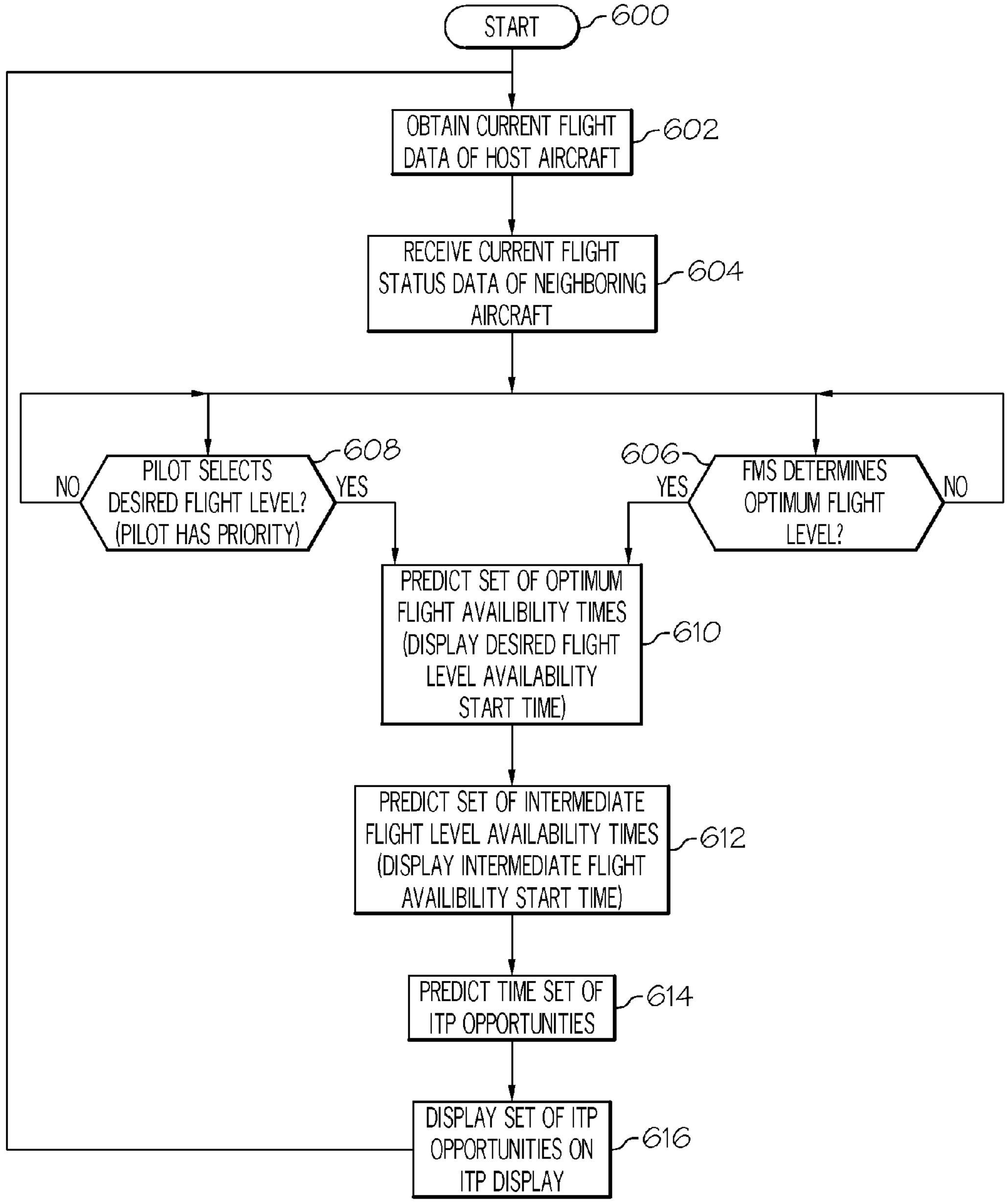
FIG. 13 is a flow chart illustrating an exemplary embodiment of an ITP display process suitable for use in conjunction with a flight deck display system.

FIG. 13 is a flow chart that illustrates an exemplary embodiment of an ITP display process 600 suitable for use with a flight deck display system shown in FIGS. 7 and 8.

Process 600 represents one implementation of a method for displaying ITP opportunities on a traffic display. The various tasks performed in connection with process 600 may be performed by software, hardware, firmware, or any combination thereof. For illustrative purposes, the following description of process 600 may refer to elements mentioned above in connection with FIGS. 7 and 8. In practice, portions of process 600 may be performed by different elements of the described system, e.g., a processor, a display element, or a data communication component. It should be appreciated that process 600 may include any number of additional or alternative tasks, the tasks shown in FIG. 13 need not be performed in the illustrated order, and process 600 may be incorporated into a more comprehensive procedure or process having additional functionality not described in detail herein. Moreover, one or more of the tasks shown in FIG. 13 could be omitted from an embodiment of the process 600 as long as the intended overall functionality remains intact.

In practice, process 600 can be performed in a virtually continuous manner at a relatively high refresh rate such that the display will be updated in real-time or substantially real time in a dynamic manner. This particular embodiment of process 600 begins (STEP 602) by obtaining data of the type described in conjunction with FIGS. 7 and 8 including the current flight status data of the host aircraft, and the current flight status data of one or more neighboring aircraft (e.g. TCAS, ADS-B). In preferred embodiments, this data is obtained using an appropriate aircraft-to-aircraft data communication technology and related subsystem components located onboard the host aircraft. This enables the host aircraft to receive the current flight status data of the other aircraft directly from the other aircraft. The data obtained in STEP 602 also includes wind modeling data, performance and guidance information, ATC data, fuel data, and flight plan data as previously discussed.

Process 600 may be performed in connection with an ITP routine, during which the pilot or other flight crew member desires to change the altitude (flight level) of the host aircraft. Accordingly, process 600 may acquire a requested or optimum new flight level that is different than the current flight level of the host aircraft. This may be associated with user manipulation of a user interface element, e.g., manual entry of the new flight level. In a preferred embodiment, one or more ITP transitions may be predicted by ITP prediction algorithm.

The particular embodiment of the process 600 begins (STEP 600) by obtaining current flight status data of the host aircraft (STEP 602). Flight status data of one or more other aircraft proximate the host aircraft is also obtained (STEP 604). In addition to the flight status data of the host and neighboring aircraft, the processed data may include the respective flight levels of host and neighboring aircraft and the flight level of the requested new flight level. The ITP opportunity times may be based on some or all of this data. For example, the opportunity times may be determined by processing the data from the host aircraft, neighboring aircraft, candidate reference aircraft, and the desired flight level.

As stated previously, the FMS may determine the optimum flight level or the pilot may select a desired flight level. In either case, the remainder of the process is the same. Thus, method 600 continues by detecting the occurrence of either the FMS determining an optimum flight level (STEP 606) or the pilot requesting a desired flight level (STEP 608). A technique such as that referred to in STEP 606 is described in U.S. Pat. No. 5,574,647 entitled "Apparatus and Method for Computing Wind-Sensitive Optimum Altitude Steps in a Flight Management System" issued Nov. 12, 1996 and assigned to the assignee of the present invention. The pilot has priority regarding whether the FMS or the pilot selects the flight level.

In either event, the processor 202 (FIG. 7) or traffic computer 203 (FIG. 8) evaluates and predicts a set of optimum flight level availability times $T_{optFL}1$, $T_{optFL}2$, . . . $T_{optFL}n$ (STEP 610). Each availability time consists of a start time and an end time. The start time is the time when the desired flight level is available to the host aircraft with standard separation from other aircraft on that flight level. End time is the time when standard separation is no longer available. Optionally, the desired availability start time is displayed.

Next, processor 202 or traffic computer 203 evaluates and predicts the set of intermediate flight level availability times $T_{int}$ ($T_{intFL}1$, Ref1, Ref2) . . . ($T_{intFL}n$, Refx, Refy) (STEP 612). Each intermediate flight level availability time consists of a start time and end time determined using ITP distance speed criteria for at most two potentially blocking aircraft. Optionally, the intermediate flight availability start times are displayed.

Processor 202 or traffic computer 203, as the case may be, next predicts a time set for ITP opportunities. T1, Ref1, Ref2 . . . Tn, Refx, Refy using the $T_{optFL}$ and $T_{intFL}$ time sets determined in STEP 610 and STEP 612 (STEP 614). This may be accomplished as follows. First, the desired flight level availability is determined. Next, the intermediate flight level availability times are determined for each intermediate flight level. There can be one or multiple flight levels and one or more availability times for each flight level. The ITP opportunity start time is the time when the desired flight level is not blocked and the intermediate flight levels are non-blocking The ITP end time is the time when the desired flight level becomes blocked or any one of the intermediate flight levels becomes blocking The ITP opportunity time is the time set consisting of the ITP opportunity start time and the ITP opportunity end time. These steps may be repeated to obtain the next ITP opportunity time.

To determine intermediate flight level availability times, it is first necessary to identify candidate reference aircraft by first identifying a maximum of two aircraft in intervening aircraft which take minimum time to satisfy ITP distance/speed criteria and consider them as candidate reference aircraft. If an intervening flight level contains only one candidate reference aircraft and no other aircraft, then the intermediate level availability start time is the time the candidate reference aircraft meets ITP distance/speed criteria. If an intermediate flight level contains two candidate reference aircraft and no other aircraft, then the intermediate flight level availability start time is the time both candidate reference aircraft meet the ITP distance/speed criteria. If an intervening flight level contains one or both candidate reference aircraft and one or more potentially blocking aircraft, then the intermediate flight level availability start time is the is the time when the candidate reference aircraft meet the ITP distance/speed criteria and the other potentially blocking aircraft meet standard separation.

If an intervening flight level contains only one candidate reference aircraft and no other aircraft, then the intermediate level availability end time is the time the candidate reference aircraft fails to meet ITP distance/speed criteria. If an intermediate flight level contains two candidate reference aircraft and no other aircraft, then the intermediate flight level availability end time is the time when any candidate reference aircraft fails to meet the ITP distance/speed criteria. If an intervening flight level contains one or both candidate reference aircraft and one or more potentially blocking aircraft, then the intermediate flight level availability end time is the is the time when any one of the candidate reference aircraft fails to meet the ITP distance/speed criteria and any one of the other potentially blocking aircraft fails to meet standard separation. Finally, the time set of ITP opportunities is displayed on display element 206 or ITP display 205, as the case may be, with possible candidate reference aircraft (STEP 616).

If no ITP opportunities can be determined because either the desired flight level or any one of the intermediate flight levels is always blocked, the ITP opportunity time can be displayed in a manner that is visually representative of the fact that an ITP transition is not possible; e.g. FL 123/NO ITP. If all traffic at the intermediate flight levels is separated as per standard longitudinal separation from the ownship and the desired flight level is not blocked, then the ITP opportunity time may be displayed in a manner to reflect that an ITP maneuver is not required; e.g. FL 123/STANDARD CLIMB/DESCENT.

Thus, there has been provided a system and method for providing a graphical/textual indication on a cockpit display that is representative of the time when an opportunity for an ITP maneuver will be available.

While at least one exemplary embodiment has been presented in the foregoing detailed description, it should be appreciated that a vast number of variations exist. For example, the techniques and methodologies presented here could also be deployed as part of a fully automated guidance system to allow the flight crew to monitor and visualize the execution of automated maneuvers. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for displaying ITP opportunities on an onboard display device of a host aircraft flying at a first flight level, the method comprising:

obtaining flight status data of the host aircraft, a first neighboring aircraft flying at a second flight level, and at least a second neighboring aircraft flying at a third flight level by a processor;

processing the flight status data of the host aircraft and each neighboring aircraft to determine a first predicted time period within which an ITP transition through the second flight level to a desired flight level can be made, a second predicted start time and a second predicted end time between which the ITP transition through the third flight level can be made;

rendering on the onboard display device a graphical representation of the host aircraft and each neighboring aircraft; and rendering the first predicted time period, the second predicted start time and the second predicted end time on the onboard display device, wherein the second predicted end time is rendered at a location on a third flight level line that the second neighboring aircraft will reach using a current ground speed differential with the host aircraft, the location being determined in accordance with standard ITP distance criteria.

2. A method according to claim 1 wherein the first predicted time within which an ITP transition can be made is identified by a first predicted start time and a first predicted end time and further comprising rendering the first predicted start time and the first predicted end time in the upper right-hand corner of the display device.

3. A method according to claim 2 further comprising rendering the predicted start time adjacent to the first neighboring aircraft on the display device.

4. A method according to claim 3 further comprising rendering an indication on the display visually representing that a transition through the second flight level is immediately available.

5. A method according to claim 4 further comprising rendering the word "NOW" adjacent to the first neighboring aircraft on the display device.

6. A method according to claim 2 further comprising:

rendering flight level lines on the display device, the host aircraft being rendered on a first flight level line and the first neighboring aircraft be rendered on a second flight level line; and rendering the first predicted start time proximate a left end of the second flight level line.

7. A method according to claim 5 further comprising:

rendering flight level lines on the display device, the host aircraft being rendered on a first flight level line and the first neighboring aircraft be rendered on a second flight level line; and rendering the first predicted start time at a first location from the first neighboring aircraft on the second flight line that the first neighboring aircraft will reach using the current ground speed differential with the host aircraft, the location being determined in accordance with standard ITP distance criteria.

8. A method according to claim 1 further comprising rendering the region on the second flight level line between the first neighboring aircraft and the first predicted start time as dashed.

9. A method according to claim 8 further comprising rendering the region on the third flight level line between the second neighboring aircraft and the second predicted end time as dashed.

10. A method for predicting ITP opportunities for a host aircraft desiring to transition from a first flight level to a second flight level, wherein at least one neighboring aircraft occupies at least one flight levels between the first and second flight levels, comprising:

detecting all aircraft at the at least one flight levels;

predicting a set of optimum flight level availability times;

predicting a set of intermediate flight level availability times;

predicting a time-set of ITP opportunities; and rendering on a display device symbology visually representative of the ITP opportunities.

11. A method according to claim 10 wherein the pilot of the host aircraft selects the optimum flight level.

12. A method according to claim 10 wherein an on-board flight management system determines an optimum flight level.

13. A method according to claim 10 wherein the step of predicting a set of intermediate flight level availability times comprises identifying candidate reference aircraft.

14. A method according to claim 10 further comprising generating symbology visually representing that no ITP transitions being possible.

15. A method according to claim 10 further comprising generating symbology visually representing that an ITP is not necessary.

16. An onboard flight display system deployed on a host aircraft, for displaying ITP opportunities while flying at a first flight level, the system comprising:

an on-board display device; and a processor operatively coupled to the display device and configured to (1) process flight status data of the host aircraft, a first neighboring aircraft flying at a second flight level, and a second neighboring aircraft flying at a third flight level, (2) predicting a time within which the host aircraft can perform an ITP transition through the second flight level to the third flight level, (3) predicting a second time within which the host aircraft can perform an ITP transition through the second flight level to the third flight level, (4) render the predicted time of the ITP transition through the second flight level on the display device, and (5) rendering the second time at a location on a third flight level line that the second neighboring aircraft will reach using the current ground speed differential with the host aircraft, the second location being determined in accordance with standard ITP distance criteria.

17. An onboard flight display system according to claim 16 wherein the processor is further configured to (1) predict a set of optimum flight level availability times; (2) predict a set of intermediate flight level availability times (3) predict a time-set of ITP opportunities, and (4) render on a display device symbology visually representative of the ITP opportunities.

18. An onboard flight display system according to claim 16 wherein the display device is an ITP display.

19. An onboard flight display according to claim 16 wherein the processor is further configured to generate symbology for rendering a textual representation of a predicted start time and a predicted end time of the ITP opportunity on the display device.

20. An onboard flight display system deployed on a host aircraft, for displaying ITP opportunities while flying at a first flight level, the system comprising:

an onboard display device; and a processor operatively coupled to the display device and configured to (1) detect all aircraft at a desired flight level; (2) predict a desired flight level availability time determined in accordance with the requirement of providing required standard separation with aircraft at the desired flight level, (3) predicting the availability time of intermediate flight levels, (4) identifying a maximum of two candidate reference aircraft with which the host aircraft can conduct an ITP transition for the desired flight level at the available time, and (5) predicting the time duration of the ITP opportunity comprising an ITP Start Time and an ITP End Time.

* * * * *